(12) United States Patent
Huang et al.

(10) Patent No.: US 11,263,347 B2
(45) Date of Patent: Mar. 1, 2022

(54) SYSTEM AND METHOD FOR IMPROVING SECURITY OF PERSONALLY IDENTIFIABLE INFORMATION

(71) Applicant: TRUATA LIMITED, Dublin (IE)

(72) Inventors: Yangcheng Huang, Dublin (IE); Nikita Rajvanshi, Dublin (IE)

(73) Assignee: TRUATA LIMITED, Dublin (IE)

( * ) Notice: Subject to any disclaimer, the term of this patent is extended or adjusted under 35 U.S.C. 154(b) by 264 days.

(21) Appl. No.: 16/702,210

(22) Filed: Dec. 3, 2019

(65) Prior Publication Data
US 2021/0165910 A1 Jun. 3, 2021

(51) Int. Cl.
*G06F 21/62* (2013.01)
(52) U.S. Cl.
CPC .................. *G06F 21/6254* (2013.01)
(58) Field of Classification Search
CPC .................................................. G06F 21/6254
See application file for complete search history.

(56) References Cited

U.S. PATENT DOCUMENTS

| | | | | |
|---|---|---|---|---|
| 8,370,340 B1* | 2/2013 | Yu | ........................... | H04L 51/12 |
| | | | | 707/724 |
| 8,918,398 B2* | 12/2014 | Petersen | ............... | H04L 67/306 |
| | | | | 707/737 |
| 9,322,974 B1* | 4/2016 | Giobbi | ............... | G06K 7/10366 |
| 2017/0083708 A1* | 3/2017 | Braghin | .............. | G06F 16/2365 |
| 2018/0316571 A1* | 11/2018 | Andrade | .......... | G06Q 10/06398 |
| 2020/0018607 A1* | 1/2020 | Balu | ....................... | G08G 1/065 |
| 2020/0019585 A1* | 1/2020 | Balu | ..................... | H04W 4/025 |
| 2020/0019815 A1* | 1/2020 | Balu | ................... | G06F 21/6218 |
| 2020/0019894 A1* | 1/2020 | Jin | ........................ | G05D 1/0291 |
| 2021/0019425 A1* | 1/2021 | Ostadzadeh | .......... | H04W 12/00 |

OTHER PUBLICATIONS

De Montjoye et al., "Unique in the Crowd: The privacy bounds of human mobility." Sci Rep 3, 1376 (2013).
Kondor et al., "Towards Matching User Mobility Traces in Large-Scale Datasets." IEEE Transactions on Big Data (2018).

* cited by examiner

*Primary Examiner* — Joseph P Hirl
*Assistant Examiner* — Stephen T Gundry
(74) *Attorney, Agent, or Firm* — Volpe Koenig

(57) ABSTRACT

A system and for improving security of personally identifiable information stored in a computer database. The system and method enable a user's location information to be maintained in a data storage and retrieval system in such a way that it prohibits a user from being uniquely identified by the location information stored in the data storage and the retrieval system.

20 Claims, 12 Drawing Sheets

- ⊙ change point
- -- trajectory partition

SYSTEM AND METHOD FOR IMPROVING SECURITY OF PERSONALLY IDENTIFIABLE INFORMATION

BACKGROUND

Personal data is considered to be an extremely valuable resource in the digital age. Current estimates predict the total amount of personal data generated globally will hit 44 zettabytes by 2020, a tenfold jump from 4.4 zettabytes in 2013. However, banks of personal data stored on the internet are also targets for thieves of the digital age. Digital thieves have been able to steal hundreds of millions of dollars' worth of personal data. In response, governments around the world have passed comprehensive laws governing the security measures required to protect personal data.

For example, the General Data Protection Regulation (GDPR) is the regulation in the European Union (EU) that imposes stringent computer security requirements on the storage and processing of "personal data" for all individuals within the EU and the European Economic Area (EEA). Article 4 of the GDPR defines "personal data" as "any information relating to an identified or identifiable natural person . . . who can be identified, directly or indirectly, in particular by reference to an identifier such as a name, an identification number, location data, an online identifier or to one or more factors specific to the physical, physiological, genetic, mental, economic, cultural or social identity of that natural person." Further, under Article 32 of the GDPR "the controller and the processor shall implement appropriate technical and organizational measures to ensure a level of security appropriate to the risk." Therefore, in the EU or EEA location data that can be used to identify an individual must be stored in a computer system that meets the stringent technical requirements under the GDPR.

Similarly, in the United States the Health Insurance Portability and Accountability Act of 1996 (HIPAA) requires stringent technical requirements on the storage and retrieval of "individually identifiable health information." HIPAA defines "individually identifiable health information" any information in "which there is a reasonable basis to believe the information can be used to identify the individual." As a result, in the United States, any information that can be used to an identify an individual must be stored in a computer system that meets the stringent technical requirements under HIPAA.

However, "Unique in the Crowd: The Privacy Bounds of Human Mobility" by Montjoye et al. (Montjoye, Yves-Alexandre De, et al. "Unique in the Crowd: The Privacy Bounds of Human Mobility." Scientific Reports, vol. 3, no. 1, 2013, doi:10.1038/srep01376), which is hereby incorporated by reference, demonstrated that individuals could be accurately identified by an analysis of their location data. Specifically, Montjoye' analysis revealed that with a dataset containing hourly locations of an individual, with the spatial resolution being equal to that given by the carrier's antennas, merely four spatial-temporal points were enough to uniquely identify 95% of the individuals. Montjoye further demonstrated that by using an individual's resolution and available outside information, the uniqueness of that individual's mobility traces could be inferred.

The ability to uniquely identify an individual based upon location information alone was further demonstrated by "Towards Matching User Mobility Traces in Large-Scale Datasets" by Kondor, Daniel, et al. (Kondor, Daniel, et al. "Towards Matching User Mobility Traces in Large-Scale Datasets." IEEE Transactions on Big Data, 2018, doi: 10.1109/tbdata.2018.2871693.), which is hereby incorporated by reference. Kondor used two anonymized "low-density" datasets containing mobile phone usage and personal transportation information in Singapore to find out the probability of identifying individuals from combined records. The probability that a given user has records in both datasets would increase along with the size of the merged datasets, but so would the probability of false positives. The Kondor's model selected a user from one dataset and identified another user from the other dataset with a high number of matching location stamps. As the number of matching points increases, the probability of a false-positive match decreases. Based on the analysis, Kondor estimated a matchability success rate of 17 percent over a week of compiled data and about 55 percent for four weeks. That estimate increased to about 95 percent with data compiled over 11 weeks.

Montjoye and Kondor concluded that an individual can be uniquely identified by their location information alone. Since the location data can be used to uniquely identify an individual, the location data may be considered "personal data" under GDPR and "individually identifiable health information" under HIPAA.

Application Ser. No. 16/702,216 entitled "A SYSTEM AND METHOD FOR IMPROVING SECURITY OF PERSONALLY IDENTIFIABLE INFORMATION", which is hereby incorporated by reference, describes an approach for anonymizing user's location information as the user moves in a "virtual space" space such as the internet.

Application Ser. No. 16/702,223 entitled "A SYSTEM AND METHOD FOR IMPROVING SECURITY OF PERSONALLY IDENTIFIABLE INFORMATION", which is hereby incorporated by reference, describes an approach for anonymizing user's financial transaction information as the user makes a sequence of purchases from different merchants.

As a result, the user's location information must be maintained in a data storage and retrieval system in such a way that it prohibits a user from being uniquely identified by the location information stored in the data storage and the retrieval system. It is therefore technically challenging and economically costly for organizations and/or third parties to use gathered personal data in a particular way without compromising the privacy integrity of the data.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION OF THE PREFERRED EMBODIMENT(S)

Figure 1A:
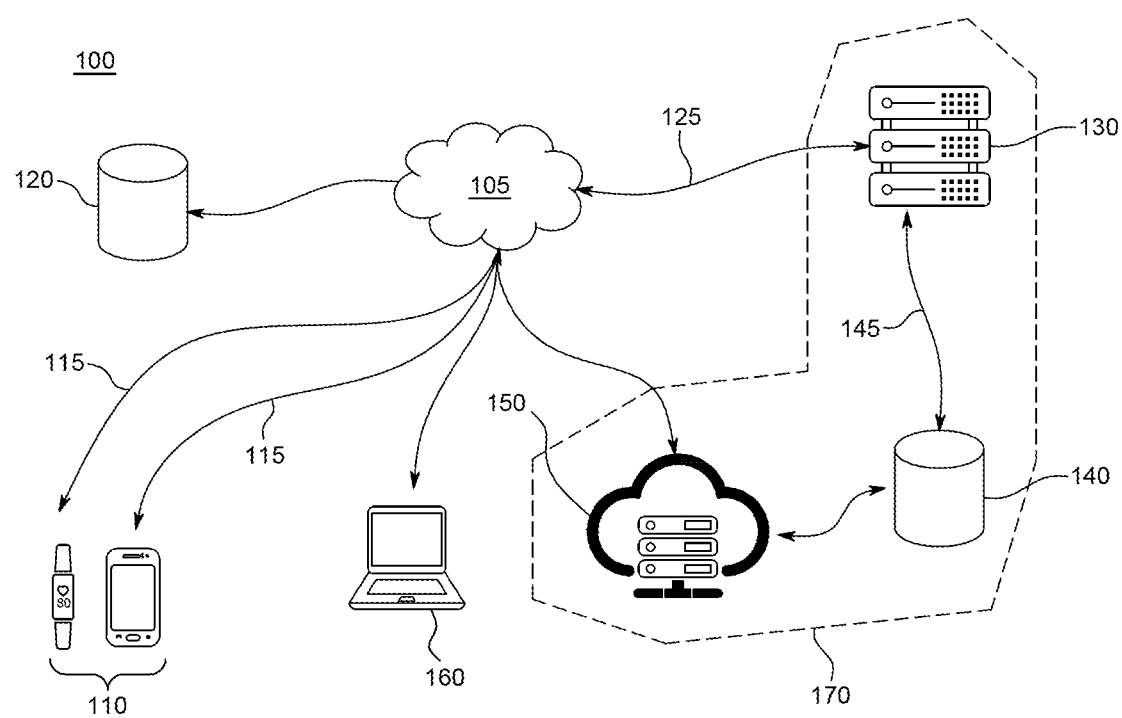
FIG. 1A is a schematic representation of a system that utilizes aspects of the secure storage method.

FIG. 1A is a diagram illustrating the components of the system 100. In system 100, location tracking devices 110 record the location of a user and a time when the location was recorded. In some instances, the location tracking devices may be a fitness tracker (such as a Fitbit®), a smartwatch (such as an Apple Watch®) or a mobile phone (such as an iPhone®). The location tracking devices 110 may determine the location of the user based on Global Positioning System (GPS), Galileo, Assisted GPS (A-GPS), Wi-Fi positioning system (WPS), cellular triangulation or any other known technology.

In some instances, the location tracking devices 110 may also record additional information about the user. This additional information may include heart rate, pulse oximetry or other sensor data on the physiological condition of the user.

In other instances, the location tracking devices 110 may be of the form of a debit/credit card or a smart wallet (such as Google Wallet®). In these instances, the location of the user may be determined based upon the location of the merchant where a purchase is made. In these instances, the additional information may include information about the purchase such as the merchant name and the amount of the purchase.

In another instance, the location tracking devices 110 may be of the form of a mobile device (mobile phones or sensors) connected to a telecom base station or WIFI or any other access points. In these instances, the location of the user may be determined based on the location of the base station cells or the location of the access points. In these instances, the additional information may include information about the communication sessions such as cell identifiers, and the signaling protocols between the device and the access points.

The location tracking devices 110 transmit the location information and any additional information to the User Identifiable Database 120 via the internet 105. Information may be sent across the wired or wireless communication channel 115 using various short-range wireless communication protocols (e.g., Wi-Fi), various long-range wireless communication protocols (e.g., 3G, 4G (LTE), 5G (New Radio)) or a combination of various short-range and long-range wireless communication protocols. The User Identifiable Database 120 stores the location information and any additional information transmitted by the location tracking devices 110 so that the User Identifiable Database 120 stores information for a plurality of users. However, a user can only access their own information that is stored in the User Identifiable Database 120. The User Identifiable Database 120 may be implemented using a structured database (e.g., SQL), a non-structured database (e.g., NOSQL) or any other database technology known in the art. The User Identifiable Database 120 may run on a dedicated computer server or may be operated by a public cloud computing provider (e.g., Amazon Web Services (AWS)®).

In other cases, the location information may be stored in a file system, either a local file storage or a distributed file storage such as HDFS, or a blob storage such as AWS S3 and Azure Blob.

The anonymization server 130 receives data stored in the User Identifiable Database 120 via the internet 105 using a wired or wireless communication channel 125. The data may be transferred using Hypertext Transfer Protocol (HTTP), File Transfer Protocol (FTP), Simple Object Access Protocol (SOAP), Representational State Transfer (REST) or any other file transfer protocol known in the art. In some instances, the transfer of data between the anonymization server 130 and the User Identifiable Database 120 may be further secured using Transport Layer Security (TLS), Secure Sockets Layer (SSL), Hypertext Transfer Protocol Secure (HTTPS) or other security techniques known in the art.

The anonymized database 140 stores the secure anonymized data received by anonymization server 130 executing the anonymization and secure storage method 500 (to be described hereinafter). In some instances, the secure anonymized data is transferred from the anonymization server 130 to the anonymization database 140 a using wired or wireless communication channel 125. In other instances, the anonymization database 140 is integral with the anonymization server 130.

The anonymized database 140 stores the secure anonymized data so that data from a plurality of users may be made available to a third party 160 without the third party 160 being able to associate the secure anonymized data with the original individual. The secure anonymized data includes location and timestamp information. However, utilizing the system and method which will be described hereinafter, the secure anonymized data cannot be traced back to an individual user. The anonymized database 140 may be implemented using a structured database (e.g., SQL), a non-structured database (e.g., NOSQL) or any other database technology known in the art. The anonymized database 140 may run on a dedicated computer server or may be operated by a public cloud computing provider (e.g., Amazon Web Services (AWS)®).

A webserver 150 allows the Third Party 160 to access the anonymized database 140. In some instances, the webserver 150 requires the Third Party 160 to be authenticated through a user name and password and/or additional means such as two-factor authentication. Communication between the webserver 150 and the Third Party 160 may be implemented using any communication protocol known in the art (e.g., HTTP or HTTPS). The authentication may be performed using Lightweight Directory Access Protocol (LDAP) or any other authentication protocol known in the art. In some instances, the webserver 150 may run on a dedicated computer server or may be operated by a public cloud computing provider (e.g., Amazon Web Services (AWS)®).

Based upon the authentication, the webserver 150 may permit the Third Party 160 to retrieve a subset of data stored in the anonymized database 140. The Third Party 160 may retrieve data from the anonymized database 140 using Structured Query Language (e.g., SQL) or similar techniques known in the art. The Third Party 160 may access the webserver 150 using a standard internet browser (e.g., Google Chrome®) or through a dedicated application that is executed by a device of the Third Party 160.

In one configuration, the anonymization server 130, the anonymized database 140 and the webserver 150 may be combined to form an Anonymization System 170.

Figure 1B:
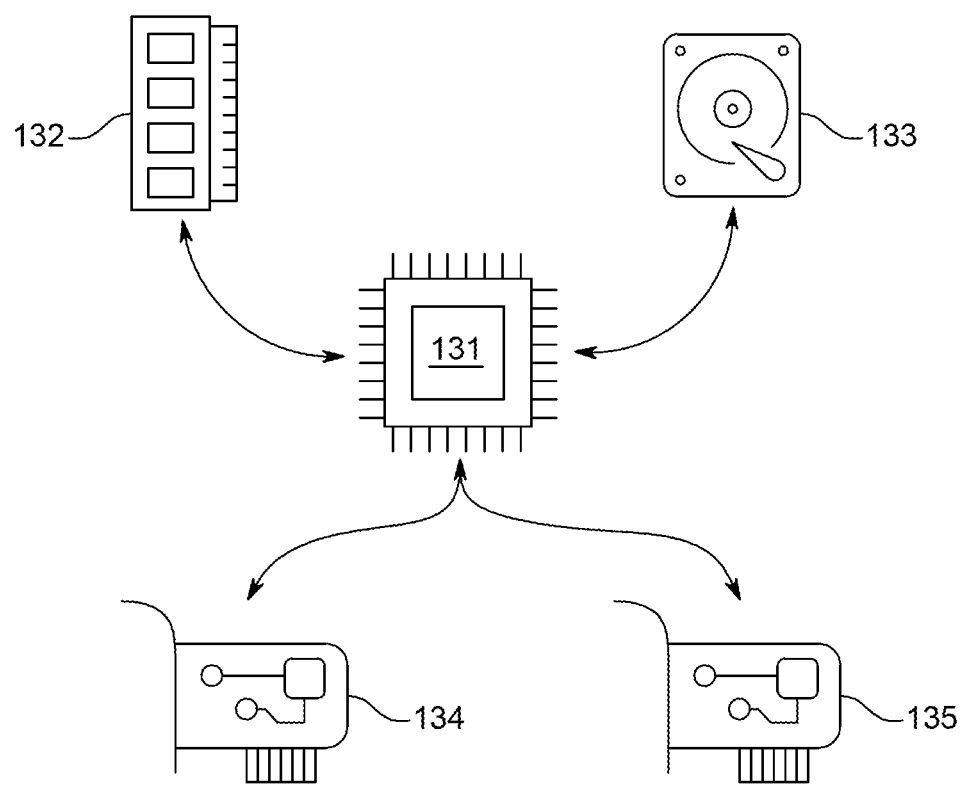
FIG. 1B is a schematic representation of an example anonymization server.

FIG. 1B is a block diagram of an example device anonymization server 130 in which one or more aspects of the present disclosure are implemented. The anonymization server 130 may be, for example, a computer (such as a server, desktop, or laptop computer), or a network appliance. The device anonymization server 130 includes a processor 131, a memory 132, a storage device 133, one or more first network interfaces 134, and one or more second network interfaces 135. It is understood that the device 130 optionally includes additional components not shown in FIG. 1B.

The processor 131 includes one or more of: a central processing unit (CPU), a graphics processing unit (GPU), a CPU and GPU located on the same die, or one or more processor cores, wherein each processor core is a CPU or a GPU. The memory 132 may be located on the same die as the processor 131 or separately from the processor 131. The memory 132 includes a volatile or non-volatile memory, for example, random access memory (RAM), dynamic RAM, or a cache.

The storage device 133 includes a fixed or removable storage, for example, a hard disk drive, a solid state drive, an optical disk, or a flash drive. The storage device 133 stores instructions enable the processor 131 to perform the secure storage methods described here within.

The one or more first network interfaces 134 are communicatively coupled to the internet 105 via communication channel 125. The one or more second network interfaces 135 are communicatively coupled to the anonymization database 140 via communication channel 145.

Figure 2:
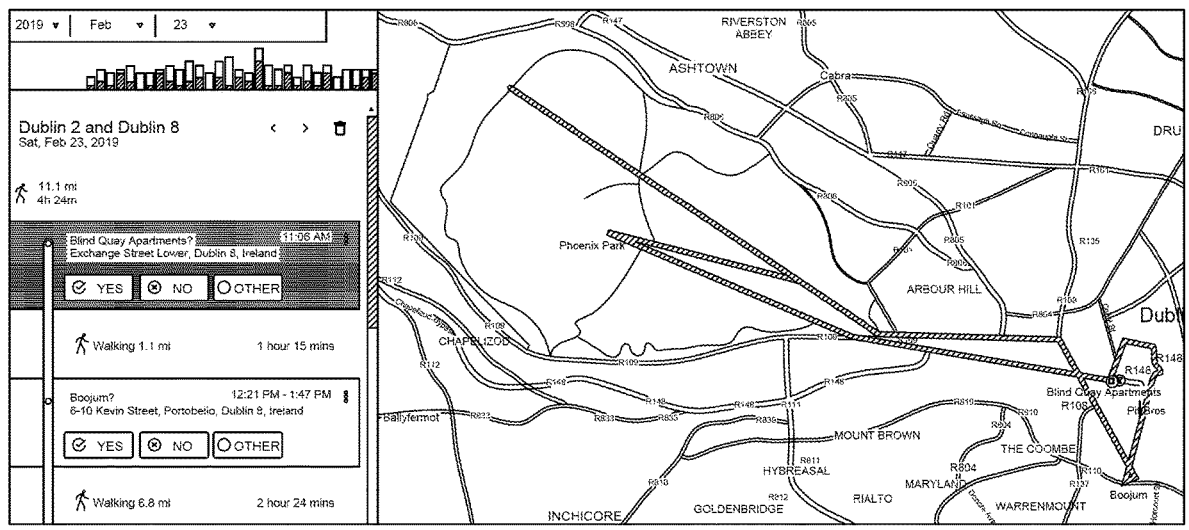
FIG. 2 is a graphical display of an example of location data collected by location tracking devices.

FIG. 2 illustrates an example of a map that can be generated based upon the location data that is collected by location tracking devices 110 when the location tracking device is a mobile phone. For example. FIG. 2 illustrates a trajectory of a runner during an 11.1 mile walk. The illustrated trajectory is formed by plotting the location and time stamp data points that were recorded by a mobile phone.

In traditional data privacy models, value ordering is not significant. Accordingly, records are represented as unordered sets of items. For instance, if an attacker knows that someone checked in first at the location c and then at e, they could uniquely associate this individual with the record t1. On the other hand, if T is a set-valued dataset, three records, namely t1, t2, and t4, would have the items c and e. Thus, the individual's identity is hidden among three records. Consequently, for any set of n items in a trajectory, there are n! possible quasi-identifiers.

However, movement trajectory records are different from the structure of other data records. For example, a movement trajectory record is made of a sequence of location points where each point is labelled with a timestamp. As a result, orders between data points is the differential factor that leads to the high uniqueness of movement trajectories. Further, the length of each trajectory doesn't have to be equal. This difference makes preventing identity disclosure in trajectory data publishing more challenging, as the number of potential quasi-identifiers is drastically increased.

As a result of the unique nature of the movement trajectory records, an individual user can be uniquely identified. Therefore, movement trajectory records must be processed and stored such that an original individual cannot be identified in order meet to the stringent requirements under GDPR and HIPAA.

Figure 3A:
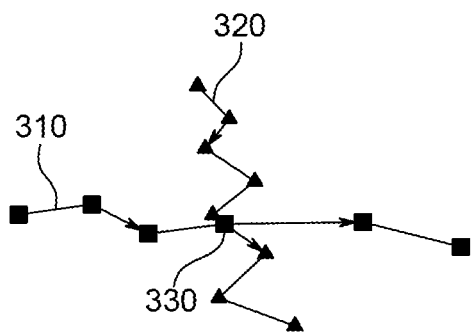
FIGS. 3A and 3B are graphical representations of a prior art method of anonymizing trajectory data.
Figure 3B:
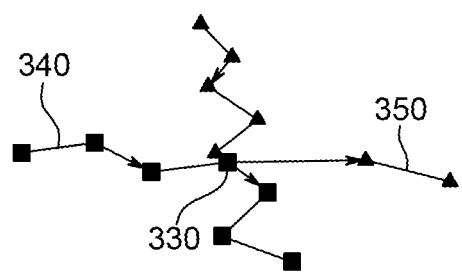

Existing solutions to the movement trajectory records problem, such as illustrated in FIG. 3A and FIG. 3B, randomly swap parts of trajectories when two trajectories intersect. For example, FIG. 3A shows a first trajectory 310 (depicted with boxes) and a second trajectory 320 (depicted with triangles) that intersect at a point 330. The existing swapping methods generate a third trajectory 340 (depicted with boxes) and a fourth trajectory 350 (depicted with triangles) as shown in FIG. 3B. The main drawback of existing trajectory swapping methods is that some of the utilities of the swapped trajectories are lost. For example, when swapping trajectories between random users that have their paths crossed, the nature of the movements is lost, and location-based analytics is invalidated. Accordingly, it is desirable for a system to retain the utility of the original information without the information being able to be traced back to the original individual.

Figure 4A:
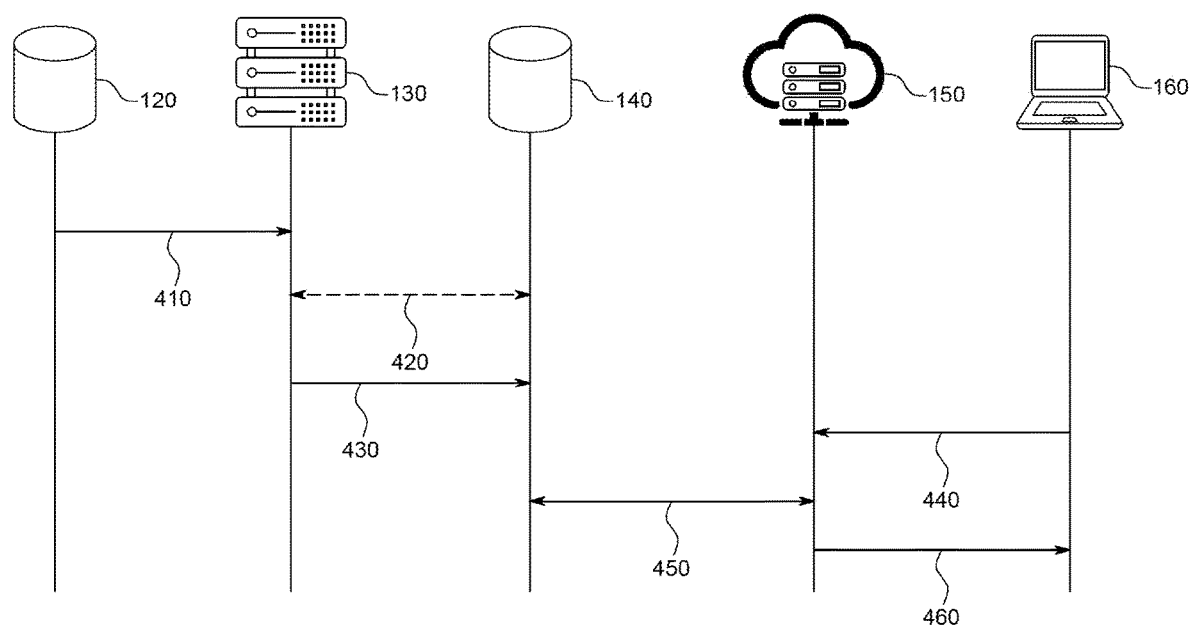
FIG. 4A is a diagram of a communication diagram between components in accordance with an embodiment.

FIG. 4A is a diagram representing communication between components in accordance with an embodiment. In step 410 location data and any additional data may be transmitted from the User Identifiable Database 120 to the anonymization server 130. The data that is transmitted from the User Identifiable Data 120 to the anonymization server 130 contains personally identifiable information of the individual users. In some instances, the data may be transmitted every time a new record is added to the User Identifiable Database 120. In other instances, the data is periodically transmitted at a specified interval. In other instances, the data may be transmitted in response to a request for the anonymization server 130. The data may be transmitted in step 410 using any technique known in the art and may utilize bulk data transfer techniques (e.g., Hadoop Bulk load).

Figure 5:
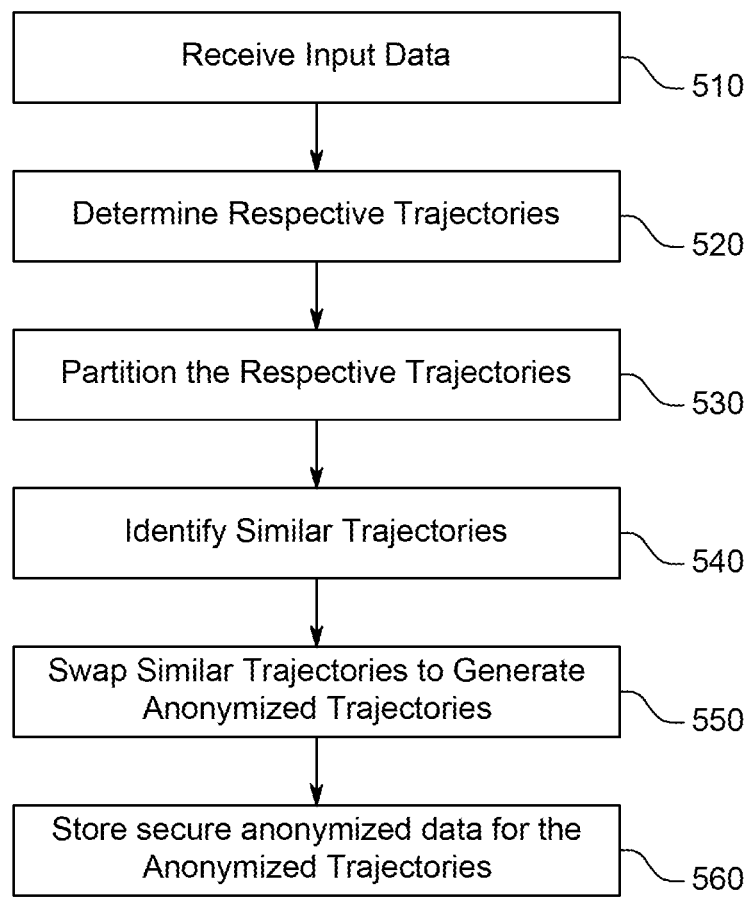
FIG. 5 is a process flow diagram of an example of the secure storage method.

In some instances, in step 420 the anonymization server 130, retrieves secure anonymized data that has been previously stored in the anonymized database 140. The additional data retrieved in step 420 may be combined with the data received in step 410 and used as the input data for the secure storage method 500. In other instances, step 420 is omitted, and anonymization server 130 performs the anonymization and secure storage method 500 (as shown in FIG. 5) using only the data received in step 410 as the input data.

In step 430, the secure anonymized data generated by anonymization server 130 is transmitted to the anonymized database 140. The data may be transmitted in step 430 using any technique known in the art and may utilize bulk data transfer techniques (e.g., Hadoop Bulk load).

The Third Party 160 retrieves the secure anonymized data from the anonymized database 140 by requesting the data from the webserver 150 in step 440. In many cases, this request may include an authentication of the Third Party 160. If the webserver 150 authenticates the Third Party 160, in step 450, the webserver 150 retrieves the secure anonymized data from the anonymized database 140. Then in step 460, the webserver 150 relays the secure anonymized data to the Third Party 160.

Figure 4B:
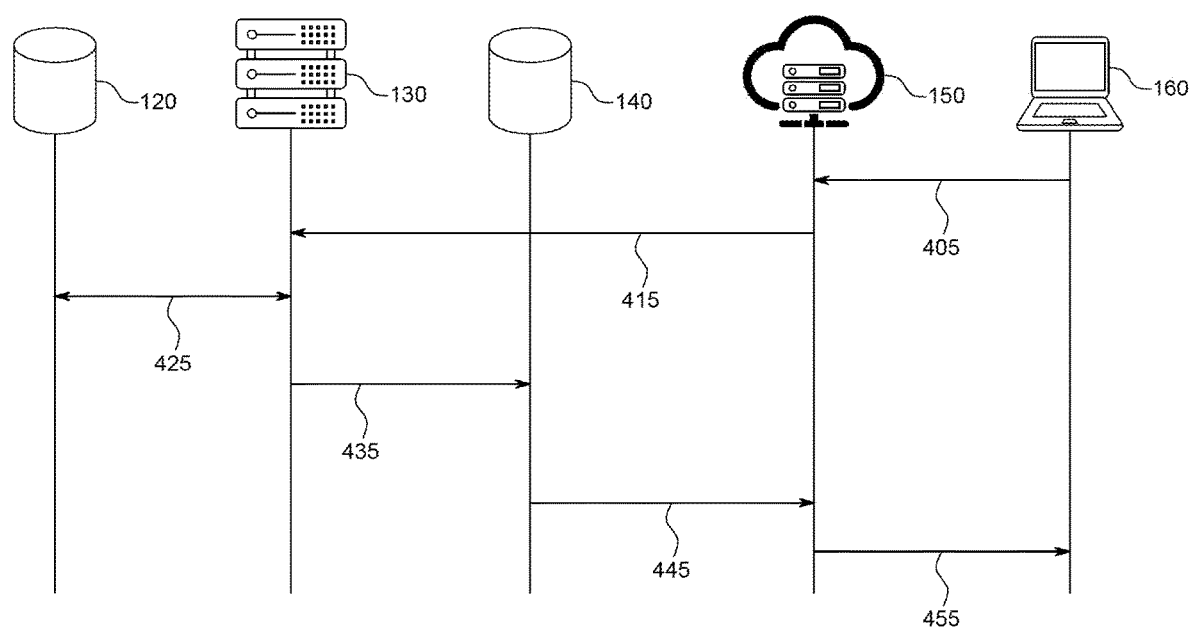
FIG. 4B is a diagram of a communication diagram between components in accordance with an embodiment.

FIG. 4B is a diagram representing communication between components in accordance with an embodiment. In step 405, the Third Party 160 requests secure anonymized data from the anonymized database 140. The request may be submitted using a web form or any other method that is provided by the webserver 150. For example, the Third Party 160 may request secure anonymized data for 25-40 year old women living in a certain region within a 50 kilometer radius of a particular location.

In response, the webserver 150 determines that the requested secure anonymized data has not previously been stored in the anonymized database 140. The webserver 150 then requests (step 415) that the anonymization server 130 generate the requested secure anonymized data. In step 425, the anonymization server 130, if required, retrieves the location information and any additional information required to generate the secure anonymized data from the User Identifiable Database 120. The data may be transmitted in step 425 using any technique known in the art and may utilize bulk data transfer techniques (e.g., Hadoop Bulk load).

In step 435, the secure anonymized data generated by anonymization server 130 is transmitted to the anonymized database 140. The data may be transmitted in step 435 using any technique known in the art and may utilize bulk data transfer techniques (e.g., Hadoop Bulk load). Then in step 445, the webserver 150 retrieves the secure anonymized data from the anonymized database 140. In step 455, the webserver 150 relays the secure anonymized data to the Third Party 160. It should be noted that in one simplified setup, if the anonymized data is resident in the Anonymized Database 140, the third party 160 may request the data and the data may be retrieved from the Anonymized Database 140. Thus communication with the anonymization server 120 and the user identifiable database 120 may not be required.

Figure 4C:
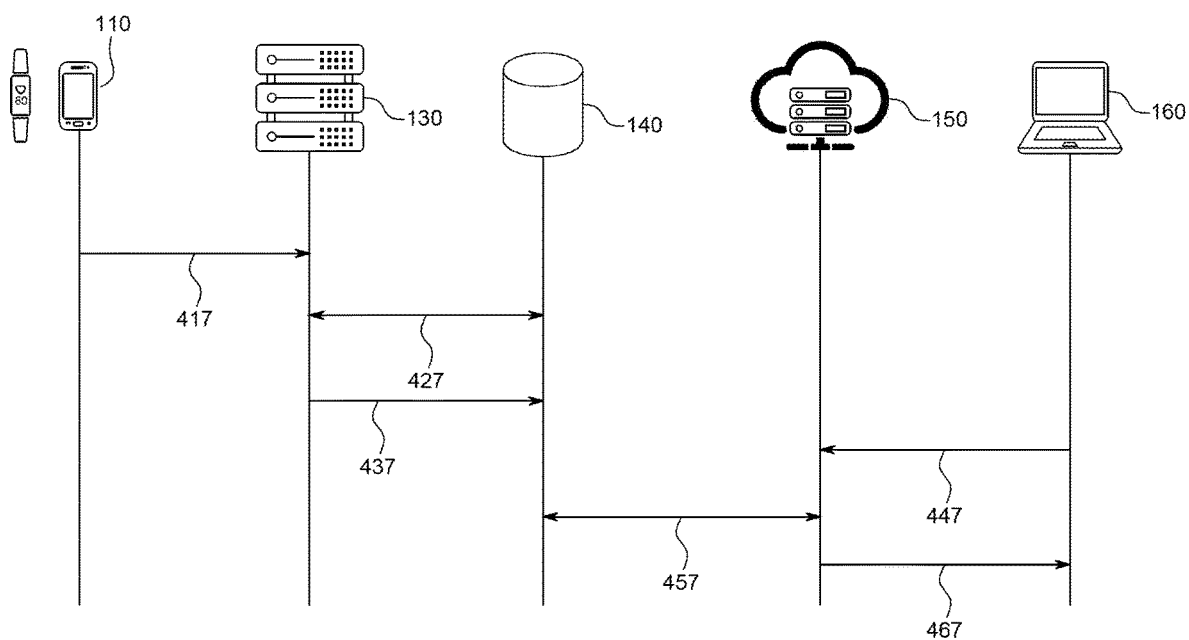
FIG. 4C is a diagram of a communication diagram between components in accordance with an embodiment.

FIG. 4C is a diagram of a communication between components in accordance with an embodiment. In step 417 location data and any additional data is transmitted from the location tracking devices 110 to the anonymization server 130 for the user's personally identifiable information to be anonymized. The data may be transmitted in step 417 transferred using Hypertext Transfer Protocol (HTTP), File Transfer Protocol (FTP), Simple Object Access Protocol (SOAP), Representational State Transfer (REST) or any other file transfer protocol known in the art.

In step 427 the anonymization server 130, retrieves secure anonymized data that has been previously stored in the anonymized database 140. The additional data retrieved in step 420 may be combined with the data received in step 410 and used as the input data for the anonymization and secure storage method 500.

In step 437, the secure anonymized data generated by anonymization server 130 is transmitted to the anonymized database 140. The data may be transmitted in step 430 using any technique known in the art and may utilize bulk data transfer techniques (e.g., Hadoop Bulk load).

The Third Party 160 retrieves the secure anonymized data from the anonymized database 140 by requesting the data for the webserver 150 in step 447. If the webserver authenticates the Third Party 160, in step 457, the webserver 150 retrieves the secure anonymized data from the anonymized database 140. Then in step 467, the webserver 150 relays the secure anonymized data to the Third Party 160.

FIG. 5 is a flow diagram of the anonymization and secure storage method 500. In step 510, location data is received from the User Identifiable Database 120. Respective movement trajectories are then determined for each of the plurality of users included in the data received in step 520. In step 530, the respective movement trajectories identified in step 520 are partitioned; similar movement trajectories are then identified based on the partitions (step 540). In step 550, the similar movement trajectories identified in step 540 are swapped. Then in step 560, secure anonymized data for the anonymized movement trajectories generated in step 550 are stored in the anonymized database 140.

The process 530 of partitioning the movement trajectories is graphically illustrated in FIGS. 6A-6D. This process 530 finds a set of partition points where the behaviors of a trajectory change rapidly. These changes may include changes in direction, velocity or other similar changes in the trajectory.

Figure 6A:
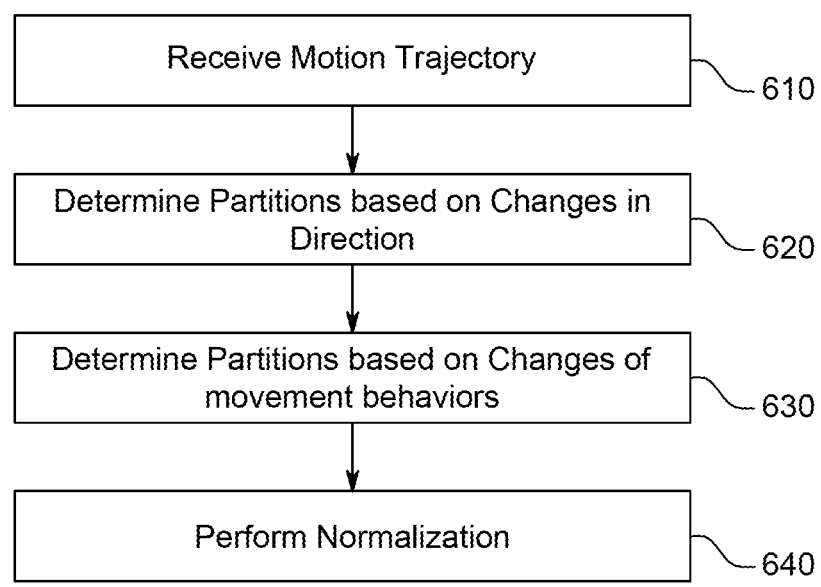
FIG. 6A illustrates an example process to partition trajectories.
Figure 6B:
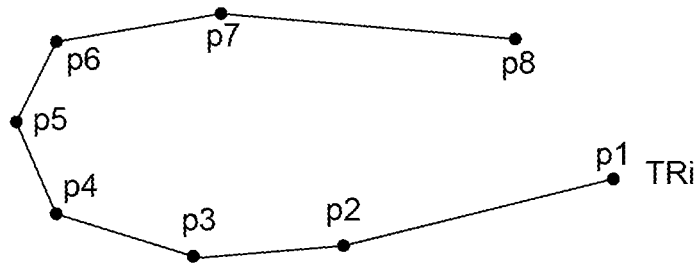
FIGS. 6B, 6C, and 6D, illustrate examples of partition trajectories.

In step 610, a movement trajectory $TR_i$ is received. An example of a movement trajectory $TR_i$ is depicted in FIG. 6B. $TR_i$ is a sequence of multi-dimensional points denoted by $TR_i = p1, p2, p3, \ldots pj \ldots pi$ ($1<i<n$), where, $p_j$ ($1<j<i$) is a d-dimensional point. The length i of a trajectory can be different from those of other trajectories. For instance, trajectory pc1, pc2, ... pck ($1<=c1<c2<\ldots<ck<i$) may be a sub-trajectory of TRi. A trajectory partition is a line partition pi pj ($i<j$), where pi and pj are the points chosen from the same trajectory.

Figure 6C:
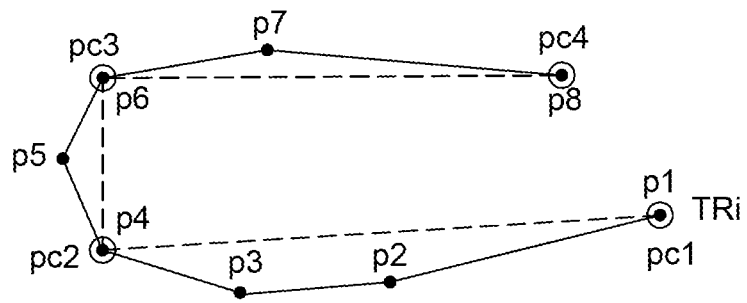

In step 620, the trajectory is divided into partitions. In some instances, the trajectory is divided into partitions using Minimum Description Length (MDL). FIG. 6C illustrates a set of partition points where the behaviors of a trajectory "change rapidly" or change more than with other trajectories.

The MDL cost consists of two components: L(H) and L(D|H), where H means the hypothesis, and D the data,
L(H) is the length, in bits, of the description of the hypothesis
L(D|H) is the length, in bits, of the description of the data when encoded with the help of the hypothesis The best hypothesis H to explain D is the one that minimizes the sum of L(H) and L(D|H). Finding the optimal partitioning translates to finding the best hypothesis using the MDL principle.
H⇒a set of trajectory partitions, D⇒a trajectory
L(H)⇒the sum of the length of all trajectory partitions
L(D|H)⇒the sum of the difference between a trajectory and a set of its trajectory partitions $$L(H) = \log_2(len(p_1 p_4))^\blacktriangledown \qquad \text{Equation 1}$$

$$L(D \mid H) = \log_2(d_\perp(p_1 p_4, p_1 p_2) + d_\perp(p_1 p_4, p_2 p_3) +$$
$$d_\perp(p_1 p_4, p_3 p_4)) + \log_2(d_\theta(p_1 p_4, p_1 p_2) + d_\theta(p_1 p_4, p_2 p_3) +$$
$$d_\theta(p_1 p_4, p_3 p_4))$$

Figure 6D:
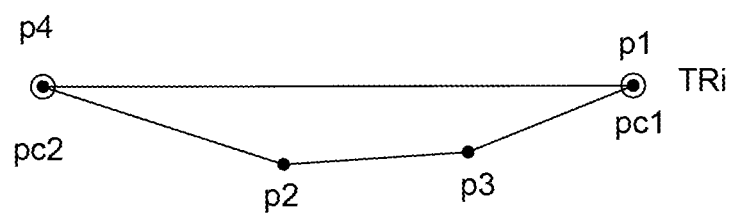

Accordingly, the optimal partitioning points are found by considering k as a data point in trajectory. Then if partitioning at current point k, starting from pi (starting point), increase the MDL cost (L(H)+L(D|H)), then add the previous point as the change point; otherwise, move to the next point. FIG. 6D illustrates an example of the optimal partitioning points for $TR_i$ In step 630, partitioning points are determined based on changes in movement behaviors (i.e., example speeds).

An example trajectory TRj that illustrates changes in movement behaviors is shown in FIG. 6B. Specifically, TRj represents a trajectory formed from points where each point measured by the location tracking device 110 is reported periodically, for example, every 5 seconds. From the distance between points the user's movement speed can be inferred. For example, as shown in FIG. 6B, the movement speed increased significantly at p2, which is an obvious changing point. However, although the movement between p5 and p6 is slowing, the points surrounding p5 and p6 still show fast movements, so p5 and p6 would not be considered as changing points.

The calculation of movement behavior may change based on how the data is collected by the location tracking devices 110. Without losing generality, it is assumed that each data point is reported periodically by the location tracking devices 110 and the length between two points may be used to represent the movement behavior. The change points then may be detected by:

$$c_{(k)} = p_{(k)} p_{(k+1)} / p_{(k-1)} p_{(k)}$$

Equation 2

If this ratio is above a threshold t, the movement behavior changes (e.g., an increase of movement speed) at the point k. If this ratio c(k) is below another threshold 1/t, and p(k+1) p(k+2)/p(k−1) p(k) is also below the threshold, the movement slow-down is detected at the point k.

In step 640, the partitions are then normalized. In the normalization process 640, the points in the same trajectory are removed from the sequence of trajectory data sets that are not the change points identified in steps 620 and 630. For example, as shown in FIG. 6D, points p2 and p3 would be removed. Since most of the movements follow the certain routes (constrained by streets and roads), partitioning and normalization help reduce the errors introduced by devices such as inaccurate GPS measurements and extract the underlying patterns of each trajectory.

The parameters used in the partitioning and normalization process may either be manually determined or automatically determined by applying statistical analysis on distributions of data points. For example, the movement speed may be classified based on the statistical analysis on the lengths of neighboring points of all trajectories: walking vs. bike vs. train vs. bus vs. car. Based on these speed metrics, the change points may be determined.

Figure 7:
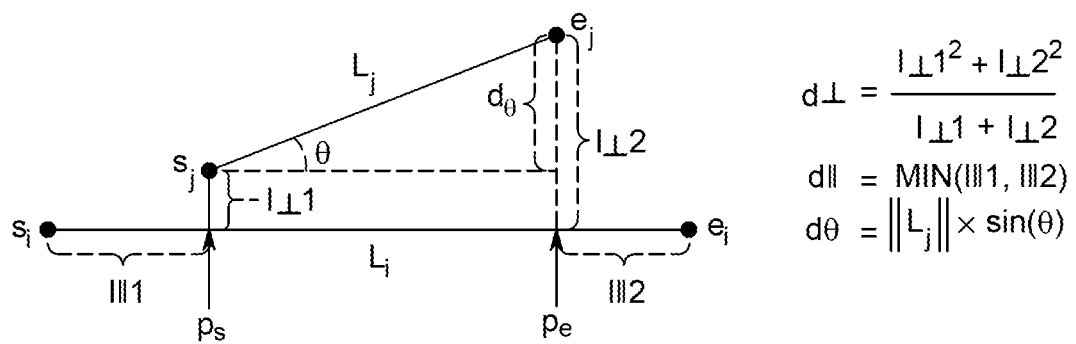
FIG. 7 illustrates an example method to determine the similarity between trajectory partitions.

FIG. 7 illustrates an example method to determine the similarity between trajectory partitions set forth in step 540 of FIG. 5. In step 540, the partitioned trajectory partitions are grouped based on their similarities. In the context of movement trajectories, the similarity between trajectory partitions may be defined as closeness between partitions. Other similarities may be based on start location, start time, end location or end time.

An example implementation of step 540 is density-based clustering, e.g. grouping partitions based on their distances between each other. In an example density-based clustering method, the distance between two partitions is calculated as the weighted sum of the three components: the perpendicular distance ($d_\perp$), parallel distance ($d_\parallel$), and angle distance ($d_\theta$). The mathematical relationship between the variables is illustrated in FIG. 7.

In some instances, step 540 may utilize density-based clustering algorithms (i.e., DBSCAN) to find the similar partitions. Trajectory partitions that are close (e.g. similar) are grouped into the same cluster.

The parameters used in this similarity analysis may be determined either manually, or automatically by applying statistical analysis on all trajectories. For example, DBSCAN requires two parameters, ε and minPts, the minimum number of partitions required to form a dense region. K-nearest neighbor may be applied to the datasets to estimate the value of ε, after minPts is chosen.

The similarity may also be determined based on additional inputs such as utility requirements. For example, when analyzing the shopping behavior between each zone of a city, the partitions starting from the same zone and ending into the same zone may be grouped as similar groups.

An example of such a utility may be to calculate the number of people visiting Dundrum Shopping Centre, Dublin on different days of the week. Trajectories that lie in Dublin, moreover in Dundrum zone of Dublin, may be clustered together. Therefore, a similarity between trajectories is calculated based on the location they lie in and if they contain a shopping center as one of the data points.

Figure 8A:
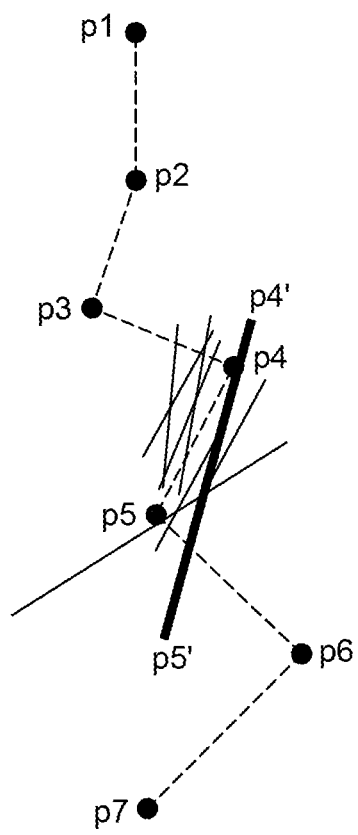
FIGS. 8A and 8B illustrate an example process to generate the anonymized trajectories.
Figure 8B:
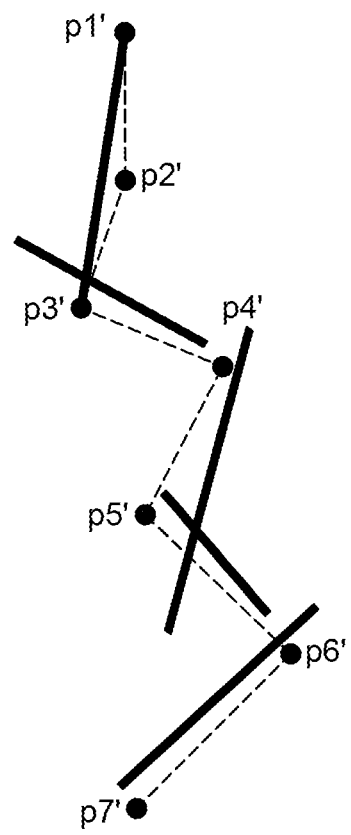

The results of the exchanging step 550 (of FIG. 5) is illustrated in FIGS. 8A and 8B. The purpose of the exchanging step 550 is to selectively shuffle partitions of multiple different trajectories based on the similarity partitions identified in step 540. For example, FIG. 8A shows the partition p4p5 has multiple similar partitions from other trajectories. To maximize the difference between the swapped partitions and hence the anonymization effects, the partitions with the maximum distance from a particular partition is chosen as the swap target (p4'p5' in the figure).

During the exchanging step 550, the partitions are paired with the selected partitions, and swapped between trajectories. Therefore, no partitions are dropped. If a partition is not in any of the clusters, the partition is left untouched.

After all partitions are swapped, the trajectory is transformed into a set of disjoined or crossed partitions as FIG. 8B. These segments are then re-assembled into the anonymized trajectory. As an example of the implementation, the following rules are used to assemble the partitions back into a trajectory:
  If a partition is crossed with another segment, the cross points are used as the anonymized trajectory point;
  If a partition is disjoined with another partition, a new partition is added to connect two partitions.

In another implementation the partitions may be joined by moving the respective end-points of the parts together.

The secure anonymized data may then be generated from the anonymized trajectory without the secure anonymized data being able to be associated with a particular user.

Although features and elements are described above in particular combinations, one of ordinary skill in the art will appreciate that each feature or element may be used alone or in any combination with the other features and elements. In addition, a person skilled in the art would appreciate that specific steps may be reordered or omitted.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read-only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs).

What is claimed is:

1. A system for improving security of personally identifiable information stored in an anonymized database, the system comprising:
  a first communication interface that is communicatively coupled to a User Identifiable Database, wherein the User Identifiable Database stores a plurality of location and time records that are associated with unique individuals;
  a second communication interface that is communicatively coupled to the anonymized database;
  a memory; and
  a processor that is communicatively coupled to the first communication interface, the second communication interface and the memory;
  wherein the processor is configured to:

receive, using the first communication interface, the plurality of location and time records from the User Identifiable Database, determine motion trajectories for each of the unique individuals based on the plurality of location and time records received, partition each of the motion trajectories into a plurality of partitions, identify similar trajectories in the plurality of partitions, generate anonymized trajectories by swapping the similar trajectories identified, and store, using the second communication, anonymized location and time records in the anonymized database based on the anonymized trajectories generated.

2. The system according to claim 1, wherein the processor is configured to partition each of the motion trajectories into the plurality of partitions based on detected changes in direction of the motion trajectories.

3. The system according to claim 1, wherein the processor is configured to partition each of the motion trajectories into the plurality of partitions based on detected changes in velocities of the motion trajectories.

4. The system according to claim 1, wherein the processor is configured to partition each of the motion trajectories into the plurality of partitions by normalizing the motion trajectories.

5. The system according to claim 1, wherein the processor is configured to partition each of the motion trajectories into the plurality of partitions using Minimum Description Length (MDL).

6. The system according to claim 1, wherein the processor is configured to identify the similarities in the trajectories in the plurality of partitions based on a density-based clustering algorithm.

7. The system according to claim 1, wherein the processor is configured to identify the similarities in the trajectories in the plurality of partitions based on a weighted sum of a perpendicular distance ($d_\perp$), a parallel distance ($d_\parallel$), and angle distance ($d_\theta$) between the plurality of partitions.

8. A method for improving security of personally identifiable information stored in an anonymized database, the method comprising:

receiving, by a processor, a plurality of location and time records from a User Identifiable Database, wherein the User Identifiable Database stores a plurality of location and time records that are associated with unique individuals;

determining, by the processor, motion trajectories for each of the unique individuals based on the plurality of location and time records received;

partitioning, by the processor, each of the motion trajectories into a plurality of partitions;

identifying, by the processor, similar trajectories in the plurality of partitions;

generating, by the processor, anonymized trajectories by swapping the similar trajectories identified, and storing, by the processor, anonymized location and time records in an anonymized database based on the anonymized trajectories generated.

9. The method according to claim 8, wherein each of the motion trajectories are partitioned into the plurality of partitions based on detected changes in direction of the motion trajectories.

10. The method according to claim 8, wherein each of the motion trajectories are partitioned into the plurality of partitions based on detected changes in velocities of the motion trajectories.

11. The method according to claim 8, wherein each of the motion trajectories are partitioned into the plurality of partitions by normalizing the motion trajectories.

12. The method according to claim 8, wherein each of the motion trajectories are partitioned into the plurality of partitions using Minimum Description Length (MDL).

13. The method according to claim 8, wherein the similarities in the trajectories in the plurality of partitions are identified based on a density-based clustering algorithm.

14. The method according to claim 8, wherein the similarities in the trajectories in the plurality of partitions are identified based on a weighted sum of a perpendicular distance ($d_\perp$), a parallel distance ($d_\parallel$), and angle distance ($d_\theta$) between the plurality of partitions.

15. A non-transitory computer readable storage medium that stores instructions that when executed by a processor cause the processor to:

receive, using a first communication interface, a plurality of location and time records from a User Identifiable Database, wherein the User Identifiable Database stores a plurality of location and time records that are associated with unique individuals;

determine motion trajectories for each of the unique individuals based on the plurality of location and time records received;

partition each of the motion trajectories into a plurality of partitions;

identify similar trajectories in the plurality of partitions;

generate anonymized trajectories by swapping the similar trajectories identified; and store, using a second communication, anonymized location and time records in an anonymized database based on the anonymized trajectories generated.

16. The non-transitory computer readable storage medium according to claim 15, wherein the instructions further cause the processor to:

partition each of the motion trajectories into the plurality of partitions based on detected changes in direction of the motion trajectories.

17. The non-transitory computer readable storage medium according to claim 15, wherein the instructions further cause the processor to:

partition each of the motion trajectories into the plurality of partitions based on detected changes in velocities of the motion trajectories.

18. The non-transitory computer readable storage medium according to claim 15, wherein the instructions further cause the processor to:

partition each of the motion trajectories into the plurality of partitions by normalizing the motion trajectories.

19. The non-transitory computer readable storage medium according to claim 15, wherein the instructions further cause the processor to:

partition each of the motion trajectories into the plurality of partitions using Minimum Description Length (MDL).

20. The non-transitory computer readable storage medium according to claim 15, wherein the instructions further cause the processor to:

identify the similarities in the trajectories in the plurality of partitions based on at least one of a density-based clustering algorithm, a weighted sum of a perpendicular distance ($d_\perp$), a parallel distance ($d_\parallel$), and angle distance ($d_\theta$) between the plurality of partitions.

* * * * *